May 21, 1935. J. KONOPKA 2,002,402
COMBINED SHOCK ABSORBING AND STABILIZING STRUCTURE
Filed May 4, 1934 2 Sheets-Sheet 2
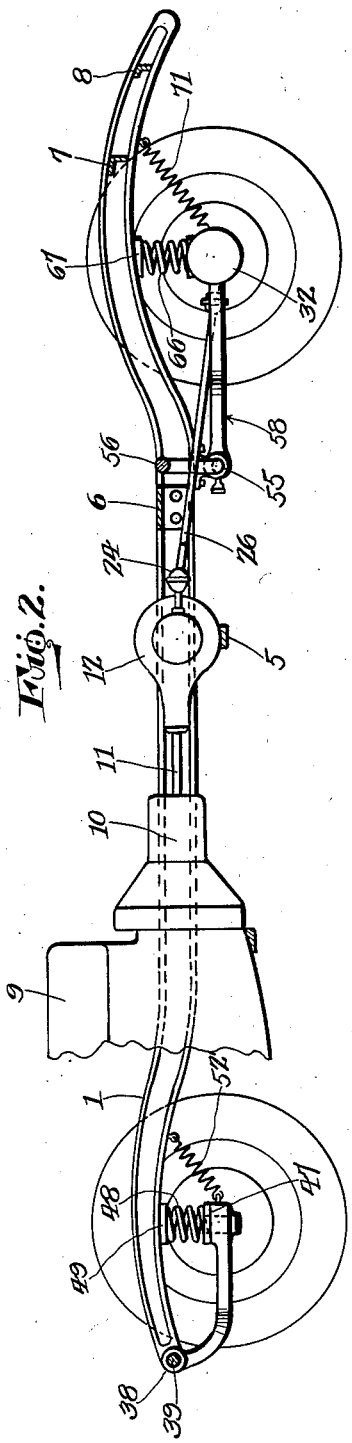
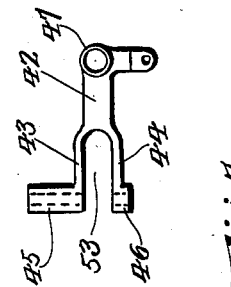
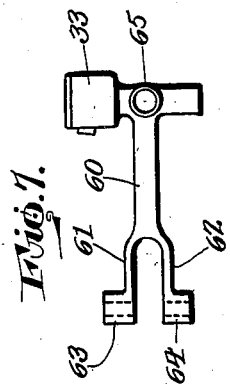
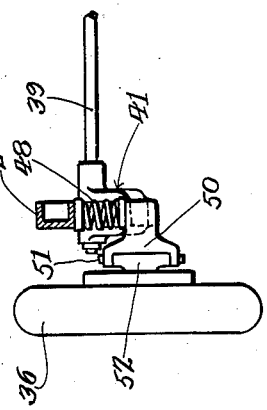
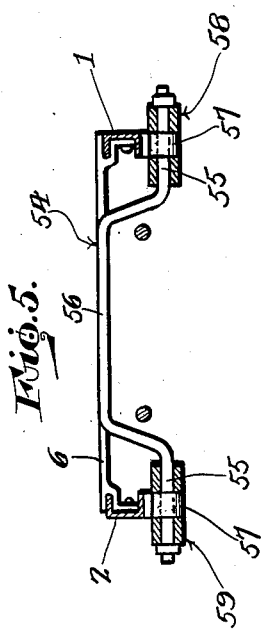
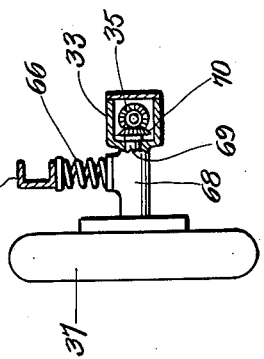
Inventor
Joseph Konopka
By Geo. P. Kimmel
Attorney Patented May 21, 1935

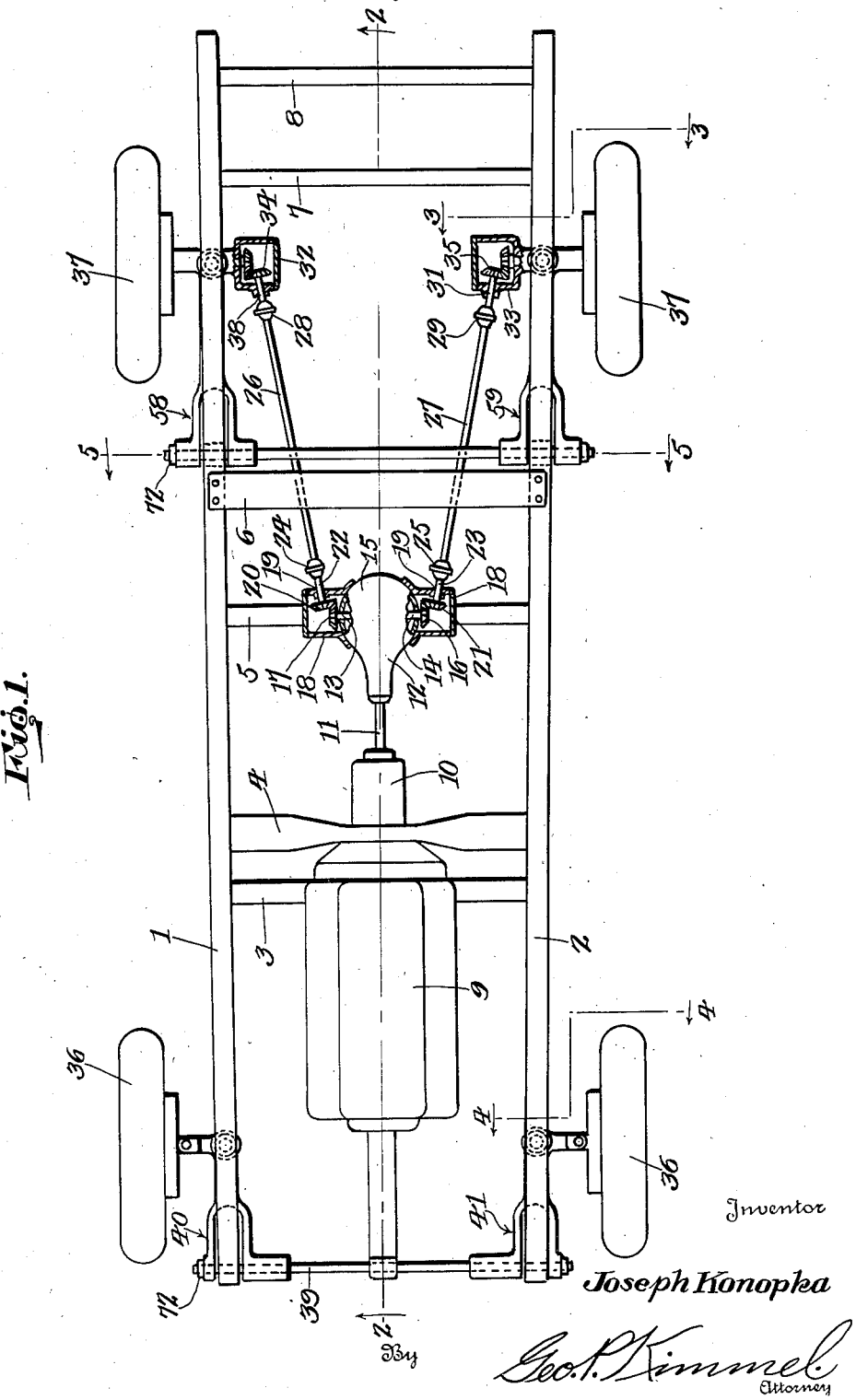

2,002,402

UNITED STATES PATENT OFFICE 2,002,402

COMBINED SHOCK ABSORBING AND STABILIZING STRUCTURE

Joseph Konopka, Detroit, Mich.

Application May 4, 1934, Serial No. 723,982

11 Claims. (Cl. 180—73)

This invention relates to a shock absorbing and stabilizing structure for the chassis of an automotive vehicle, and has for its object to provide, in a manner as hereinafter set forth, means whereby each of the front and rear wheels of the vehicle is capable of being separately sprung, to absorb road shock and to stabilize the chassis, when the wheel meets with and travels over an obstruction or enters into and passes out of a depression in the line of travel of the vehicle.

A further object of the invention is to provide, in a manner as hereinafter set forth, a means for the purpose referred to acting to maintain the wheel in its normally perpendicular position with respect to the line of travel of the vehicle when the wheel meets with and passes over an obstruction or enters into and passes out of a depression.

A further object of the invention is to provide, in a manner as hereinafter set forth, a combined shock absorbing and chassis stabilizing structure for absorbing road shock and for ensuring an even non-tilting suspension of the chassis to attain smooth and comfortable riding by the occupants of the vehicle when a front or rear wheel of the latter meets with and travels over an obstruction or when entering into, travelling in and passing out of a depression in the line of travel of the vehicle.

To the above ends essentially, and to others which may hereinafter appear, the invention consists of such parts, and such combination of parts which fall within the scope of the invention as claimed.

In the drawings:—

Figure 1 is a top plan view of the chassis of an automotive vehicle showing the installation therewith of a combined shock absorbing and stabilizing structure in accordance with the invention.

Figure 2 is a section on line 2—2 Figure 1.

Figure 3 is a section on line 3—3 Figure 1.

Figure 4 is a section on line 4—4 Figure 1.

Figure 5 is a section on line 5—5 Figure 1.

Figure 6 is a top plan view of the form of front fork element, and

Figure 7 is a top plan view of the form of rear fork element.

Referring to the drawings 1 and 2 indicate the side bars and 3, 4, 5, 6, 7 and 8 the cross members of the chassis of an automotive vehicle. Supported by the chassis is the engine, transmission mechanism, drive shaft and differential mechanism of the vehicle and which are indicated at 9, 10, 11 and 12 respectively. As shown the differential mechanism 12 is rearwardly of and in close proximity to the transverse median of the chassis. The mechanism 12 includes a pair of oppositely disposed shafts 13, 14 extended from the housing 15 and carrying beveled gears 16, 17 respectively on their outer ends. The gears 16, 17 are enclosed by casings 18 secured to the housing 15. The rear wall of each casing is provided with an outwardly inclined opening 19. Meshing with the gears 17, 16 are oppositely inclined beveled gears 20, 21 respectively having extending rearwardly therefrom oppositely inclined stub shafts 22, 23 respectively which pass through the openings 19. The shafts 22, 23 are universally coupled as at 24, 25 respectively to oppositely outwardly inclined rearwardly extending transmission shafts 26, 27 respectively which in turn are universally coupled, as at 28, 29 respectively to a pair of oppositely outwardly inclined stub shafts 30, 31 respectively extending into housings 32, 33 respectively. The shafts 30, 31 carry oppositely inclined beveled gears 34, 35 arranged within the housings 32, 33 respectively.

The front and rear wheels of the vehicle are designated 36, 37 respectively.

The forward end of each of the side bars of the chassis is formed with an opening 38. The openings 38 are arranged in alignment and extending therethrough is a forward hanger shaft 39 projecting outwardly from each side bar. Pivotally mounted upon shaft 39 is a pair of spaced rearwardly extending stabilizing elements 40, 41 of fork-like contour and of like form. Each of said elements consists of a shank 42 having extending forwardly therefrom and offset with respect thereto a pair of spaced parallel upwardly curved tines 43, 44 formed at their upper ends with oppositely disposed tubular bearings 45, 46 respectively. The bearing 45 is of greater length than the bearing 46. The bearings 45, 46 are loosely mounted upon shaft 39 and disposed on opposite sides of a side bar of the chassis. The upper face at the rear end of shank 42 is formed with a cup 47 for receiving the lower end of an expandible vertically disposed shock absorbing spring 48. The latter is interposed between the cup 47 and a cup 49 formed on the lower face of a chassis side bar at a point rearwardly of shaft 39. The shank 42 at its rear is formed with an outwardly directed yoke 50 to which is pivotally connected, as at 51 an axle spindle 52 for a front wheel 36. The shank 42 is resiliently connected to a chassis side bar by a coil spring 52'. When an element 40 or 41 is in position the chassis side bar is arranged over the opening 53 between the tines 43, 44. The spring 49 functions to maintain a front wheel substantially at all times perpendicular to the direction of the line of travel of the vehicle. The arrangement shown permits of each front wheel to be sprung independent of the other.

Arranged at a point intermediate the shafts 26, 27 is a rear hanger shaft 54 formed of a pair of spaced parallel end stretches 55 and an intermediate stretch 56 of arch-shape form. Anchored to the lower faces of the side bars 1, 2 are parallel bearing members 57 for the stretches 55 of shaft 54. The stretches 55 extend outwardly and inwardly with respect to the bearing members 55. Pivotally mounted upon and extending rearwardly from shaft 54 is a pair of stabilizing elements 58, 59 of like form. Each of said elements consists of a shank 60 having extended from and offset with respect to its front end a pair of spaced parallel tines 61, 62 formed with oppositely extending tubular bearings 63, 64 respectively at their forward ends. The bearings 63, 64 are mounted on shaft 54 in alignment with the bearing members 57. The upper face at the rear end of the shank 60 is formed with a cup 65 for the reception of the lower end of a shock absorbing spring 66. The upper end of the latter is seated in a cup 67 formed on the lower face of a chassis side bar. The shank 60 at its rear is integral with the rear end of a tubular housing 68 for a rear wheel axle 69. A housing 32 or 33 is integral with the rear end of housing 68. The axle 69 extends into a housing 32 or 33 and is formed with a bevel gear 70 which meshes with a bevel gear 34 or 35. The shank 60 is resiliently connected to a chassis side bar, as at 71. The constructive arrangement as aforesaid with respect to the elements 58, 59 permits of the rear wheels being sprung independently of each other and further permanently maintains a rear wheel substantially perpendicular to the line of travel of the vehicles.

The constructive arrangements of the front and rear stabilizing elements, and the positions of the springs 48, 49 with respect to said elements will obtain the objects as hereinbefore referred to.

Nuts 72 are mounted on the ends of the shafts 39 and 54 for securing the said shafts to the side bars 1, 2.

What I claim is:

1. In a combined shock absorbing and stabilizing structure for automotive vehicles, the combination with the side bars of the chassis and the rear wheels of the vehicle, of a pair of parallel spaced endwise opposed bearings secured to the lower face of said bars, a hanger shaft journaled in and extended laterally from said bearings, a pair of stabilizing elements having forked shaped forward ends straddling said bearings and pivotally mounted on said shaft and having laterally extending tubular means at the rear ends, driven axle spindles extending through said means and connected to said wheels, and resilient means interposed between the said tubular means and the lower face of said bars.

2. In a combined shock absorbing and stabilizing structure for automotive vehicles, the combination with the side bars of the chassis, the motor, the differential, and the rear wheels of the vehicle, the differential being operated from the motor, of a pair of parallel spaced endwise opposed bearings secured to the lower face of said bars, a hanger shaft journaled in and extended laterally from said bearings, a pair of stabilizing elements having forked shaped forward ends straddling said bearings and pivotally mounted on said shaft and having laterally extending tubular means at the rear ends, driven axle spindles extending through said means and connected to said wheels, a pair of oppositely disposed rearwardly extending driving elements driven from said differential and operatively connected with said driven axle spindles for operating the latter, and resilient means interposed between said tubular means and the lower face of said bars.

3. In a combined shock absorbing and stabilizing structure for automotive vehicles, the combination with the side bars of the chassis and the rear wheels of the vehicle, of a pair of parallel spaced endwise opposed bearings secured to the lower face of said bars, a hanger shaft journaled in and extended laterally from said bearings, a pair of stabilizing elements having forked shaped forward ends straddling said bearings and pivotally mounted on said shaft and having laterally extending tubular means at the rear ends, driven axle spindles extending through said means and connected to said wheels, resilient means interposed between the said tubular means and the lower face of said bars, and resilient connections between the rear ends of said stabilizing elements and said bars.

4. In a combined shock absorbing and stabilizing structure for automotive vehicles, the combination with the side bars of the chassis, the motor, the differential, and the rear wheels of the vehicle, the differential being operated from the motor, of a pair of parallel spaced endwise opposed bearings secured to the lower face of said bars, a hanger shaft journaled in and extended laterally from said bearings, a pair of stabilizing elements having forked shaped forward ends straddling said bearings and pivotally mounted on said shaft and having laterally extending tubular means at the rear ends, driven axle spindles extending through said means and connected to said wheels, a pair of oppositely disposed rearwardly extending driving elements driven from said differential and operatively connected with said driven axle spindles for operating the latter, resilient means interposed between said tubular means and the lower face of said bars, and resilient connections between the rear ends of said stabilizing elements and said bars.

5. In a combined shock absorbing and stabilizing structure for automotive vehicles, the combination with the side bars of the chassis, the motor, the differential, and the rear wheels of the vehicle, the differential being operated from the motor, of a pair of parallel spaced endwise opposed bearings secured to the lower face of said bars, a hanger shaft journaled in and extended laterally from said bearings, a pair of stabilizing elements having forked shaped forward ends straddling said bearings and pivotally mounted on said shaft and having laterally extending tubular means at the rear ends, driven axle spindles extending through said means and connected to said wheels, a pair of oppositely disposed rearwardly extending driving elements driven from said differential and operatively connected with said driven axle spindles for operating the latter, resilient means interposed between said tubular means and the lower face of said bars, and each of said driving elements formed of a series of sections universally connected together in endwise opposed relation.

6. In a combined shock absorbing and stabilizing structure for automotive vehicles, the combination with the side bars of the chassis, the motor, the differential, and the rear wheels of the vehicle, the differential being operated from the motor, of a pair of parallel spaced endwise opposed bearings secured to the lower face of said bars, a hanger shaft journaled in and extended laterally from said bearings, a pair of stabilizing elements having forked shaped forward ends straddling said bearings and pivotally mounted on said shaft and having laterally extending tubular means at the rear ends, driven axle spindles extending through said means and connected to said wheels, a pair of oppositely disposed rearwardly extending driving elements driven from said differential and operatively connected with said driven axle spindles for operating the latter, resilient means interposed between said tubular means and the lower face of said bars, resilient connections between the rear ends of said stabilizing elements and said bars, and each of said driving elements formed of a series of sections universally connected together in endwise opposed relation.

7. In a combined shock absorbing and stabilizing structure for automotive vehicles, the combination with the side bars of the chassis, the motor, the differential, and the rear wheels of the vehicle, the differential being operated from the motor, of a pair of parallel spaced endwise opposed bearings secured to the lower face of said bars, a hanger shaft journaled in and extended laterally from said bearings, a pair of stabilizing elements having forked shaped forward ends straddling said bearings and pivotally mounted on said shaft and having laterally extending tubular means at the rear ends, driven axle spindles extending through said means and connected to said wheels, a pair of oppositely disposed rearwardly extending driving elements driven from said differential and operatively connected with said driven axle spindles for operating the latter, resilient means interposed between said tubular means and the lower face of said bars, and said differential and said stabilizing elements provided with bearing means for said driving elements.

8. In a combined shock absorbing and stabilizing structure for automotive vehicles, the combination with the side bars of the chassis, the motor, the differential, and the rear wheels of the vehicle, the differential being operated from the motor, of a pair of parallel spaced endwise opposed bearings secured to the lower face of said bars, a hanger shaft journaled in and extended laterally from said bearings, a pair of stabilizing elements having forked shaped forward ends straddling said bearings and pivotally mounted on said shaft and having laterally extending tubular means at the rear ends, driven axle spindles extending through said means and connected to said wheels, a pair of oppositely disposed rearwardly extending driving elements driven from said differential and operatively connected with said driven axle spindles for operating the latter, and resilient means interposed between said tubular means and the lower face of said bars, and each of said driving elements formed of a series of sections universally connected together in endwise opposed relation, said differential provided with bearing means for the forward sections of the driving elements, and said stabilizing elements having bearing means for the rear sections of said driving elements.

9. In a combined shock absorbing and stabilizing structure for automotive vehicles, the combination of the side bars of the chassis, the rear wheels, the motor and differential of the vehicle; a hanger shaft suspendingly journaled from and extending laterally from each of said bars, a pair of stabilizing elements of like form, each consisting of a stem, a pair of tines at the forward end of and offset with respect to said stem, an outwardly directed tubular means at the rear end of the stem and a housing inwardly of and communicating with said means, said tines straddling said bars and pivotally mounted on said shaft, driven axle spindles extended from said housings, through said means and connected to said wheels, a pair of rearwardly extending oppositely, outwardly inclined driving elements operated from said differential, extending into said housing and operatively engaging with said spindles for driving the latter, and resilient means interposed between said tubular means and the lower face of said bars.

10. In a combined shock absorbing and stabilizing structure for automotive vehicles, the combination of the side bars of the chassis, the rear wheels, the motor and differential of the vehicle; a hanger shaft suspendingly journaled from and extending laterally from each of said bars, a pair of stabilizing elements of like form, each consisting of a stem, a pair of tines at the forward end of and offset with respect to said stem, an outwardly directed tubular means at the rear end of the stem and a housing inwardly of and communicating with said means, said tines straddling said bars and pivotally mounted on said shaft, driven axle spindles extended from said housings, through said means and connected to said wheels, a pair of rearwardly extending oppositely, outwardly inclined driving elements operated from said differential, extending into said housing and operatively engaging with said spindles for driving the latter, resilient means interposed between said tubular means and the lower face of said bars, and resilient means connected to said tubular means and said bars.

11. In a combined shock absorbing and stabilizing structure for automobile vehicles, the combination with the side bars of the chassis and a pair of wheels of the vehicle, of a hanger shaft connected at its ends with and supported from said bars, said shaft having its end terminal portions extended outwardly with respect to the outer side faces of said bars, a pair of spaced parallel independently movable stabilizing elements of fork like contour, each of said elements including a shank disposed below and arranged in parallel spaced relation with respect to the lower face of one of said bars, said shank terminating at its forward end into a pair of oppositely offset spaced upstanding curved parallel tines provided at their forward ends with aligning apertures and oppositely disposed aligning spaced tubular bearings aligning with said apertures, each end terminal portion of the shaft loosely extending through the aligning openings and bearings at the upper ends of a pair of tines, the upper ends of each pair of tines being disposed in lateral relation with respect to the outer and inner side faces of a chassis bar, said elements having outwardly directed right angularly disposed means at the rear end of the outer sides of their shanks for rotatably connecting said wheels therewith, and vertically disposed springs interposed between the rear ends of the upper faces of said shanks and the lower faces of said chassis bars.

JOSEPH KONOPKA.